United States Patent [19]
Fraser

[11] 3,979,733
[45] Sept. 7, 1976

[54] DIGITAL DATA COMMUNICATIONS SYSTEM PACKET SWITCH

[75] Inventor: Alexander Gibson Fraser, Bernardsville, N.J.

[73] Assignee: Bell Telephone Laboratories, Incorporated, Murray Hill, N.J.

[22] Filed: May 9, 1975

[21] Appl. No.: 575,937

[52] U.S. Cl. .......................... 340/172.5; 179/15 AQ
[51] Int. Cl.[2] ....................... H04J 3/08; H04J 6/00
[58] Field of Search ............. 340/172.5; 179/15 AQ

[56] References Cited
UNITED STATES PATENTS

| | | | |
|---|---|---|---|
| 3,883,855 | 5/1975 | Brightman et al. ............. | 340/172.5 |
| 3,891,807 | 6/1975 | Charransol et al. ............ | 179/15 BS |
| 3,906,161 | 9/1975 | Schlichte ....................... | 179/15 AQ |

Primary Examiner—Gareth D. Shaw
Assistant Examiner—C. T. Bartz
Attorney, Agent, or Firm—Richard J. Roddy

[57] ABSTRACT

A data communications system designed to facilitate communications between digital computers typically routes fixed-length segments of data, called packets, through minicomputer packet switches located intermediate the digital computers. To mitigate the need for expensive minicomputer arrangements as the intermediate processor, the minicomputers are replaced by a low-cost, high-throughput, modular packet switch having an efficient control memory-queue control arrangement for moving a packet from one time slot to another as well as modifying the packet header as the packet is routed through the communications system.

14 Claims, 5 Drawing Figures

DIGITAL DATA COMMUNICATIONS SYSTEM PACKET SWITCH

BACKGROUND OF THE INVENTION

1. Field of the Invention

This invention relates to digital communications systems and, more particularly, to a switching unit for routing data through a time-division digital communications system.

2. Description of the Prior Art

It is often desirable to exchange digital messages between digital devices. U.S. Pat. No. 3,749,845 issued to A. G. Fraser on July 31, 1973 discloses a digital data communications system including a network of interconnected switching units, each switching unit having connected thereto a transmission loop and each loop having one or more digital devices attached thereto. The prior art system provides controllable buffering of digital data, thereby allowing digital devices having different data transfer speeds and storage capabilities to communicate asynchronously. The system creates an actual communications path only when the requesting device is transmitting data. Thus, other system resources need not remain committed between bursts of data.

The data to be transmitted between the digital devices is typically formatted into a plurality of fixed-length segments called packets. Each packet includes header routing information for identifying a destination device. The header, usually unique at least on a communication channel between two switching units, is used by intermediate switching units for routing the packet through the network toward its destination.

A central component of the known switching unit is a digital computer operating as a packet switch. The computer is programmed to allow dynamic prescheduling of requested communications paths, thereby mitigating the total communications time and cost.

The prior art switching unit, called a demand-sharing unit, obtains economies by taking advantage of the usually bursty nature of the data. However, a demand-sharing unit typically employs more complex, and hence more expensive, switching equipment than would a switching unit incorporating the time-division art. As the number of devices served by a communications channel increases, the resultant transmitted data will typically approach a steady level, which is economically consistent with the time-division art. Accordingly, it is an object of the invention to provide a less expensive packet switching unit for routing data through a time-division digital data communications system.

Unfortunately, known packet switches have rarely obtained high throughput, i.e., throughput in excess of one million bits per second. This problem stems partly from packet routing overhead concomitant to the packet switch digital computer employing many processor cycles in routing a packet. Throughput can be increased by increasing processor speed; however, increasing the processor speed typically has an ensuing increase in packet switch cost. On the other hand, a packet switch operating in a digital communications system having transmitted data concentrated onto one or a few channels, for example, by time-division multiplexing techniques, can achieve high throughput. Accordingly, it is a further object of the invention to provide a less expensive packet switch having improved throughput consistent with packet routing overhead.

Concentrating data onto a few channels often leads to a contention problem. The contention problem arises from independent devices transmitting packets which may arrive simultaneously at a point. The contention problem can be overcome by queuing; however, queue control then becomes a problem. It is a still further object of the invention to provide a less expensive packet switch with an improved queue-control arrangement.

Known packet switches are not of modular construction. Hence, growth of a digital data communications system, as, for example, growth which arises by adding more digital devices to the system, has been economically stymied. Accordingly, it is still another object of the invention to provide a modular packet switch.

SUMMARY OF THE INVENTION

These and other objects are achieved in accordance with the principles of my invention in an improved packet switch for routing a packet of data through a digital data communications system. The packet switch includes a packet store, a control memory, and a queue control. The packet store comprises a plurality of queues for storing respective packets of data, a queue corresponding to a time slot in a time multiplexed data frame. The control memory includes apparatus for controlling the transfer of a packet from a first time slot to a second time slot. Further, the control memory includes apparatus for changing the packet header routing information. The queue control includes apparatus for storing a data packet in a respective one of the plurality of queues. Further, the queue control comprises apparatus for reading the data packet from the queue and for inserting the packet in the second time slot of an output multiplex data frame.

DETAILED DESCRIPTION

Figure 1:
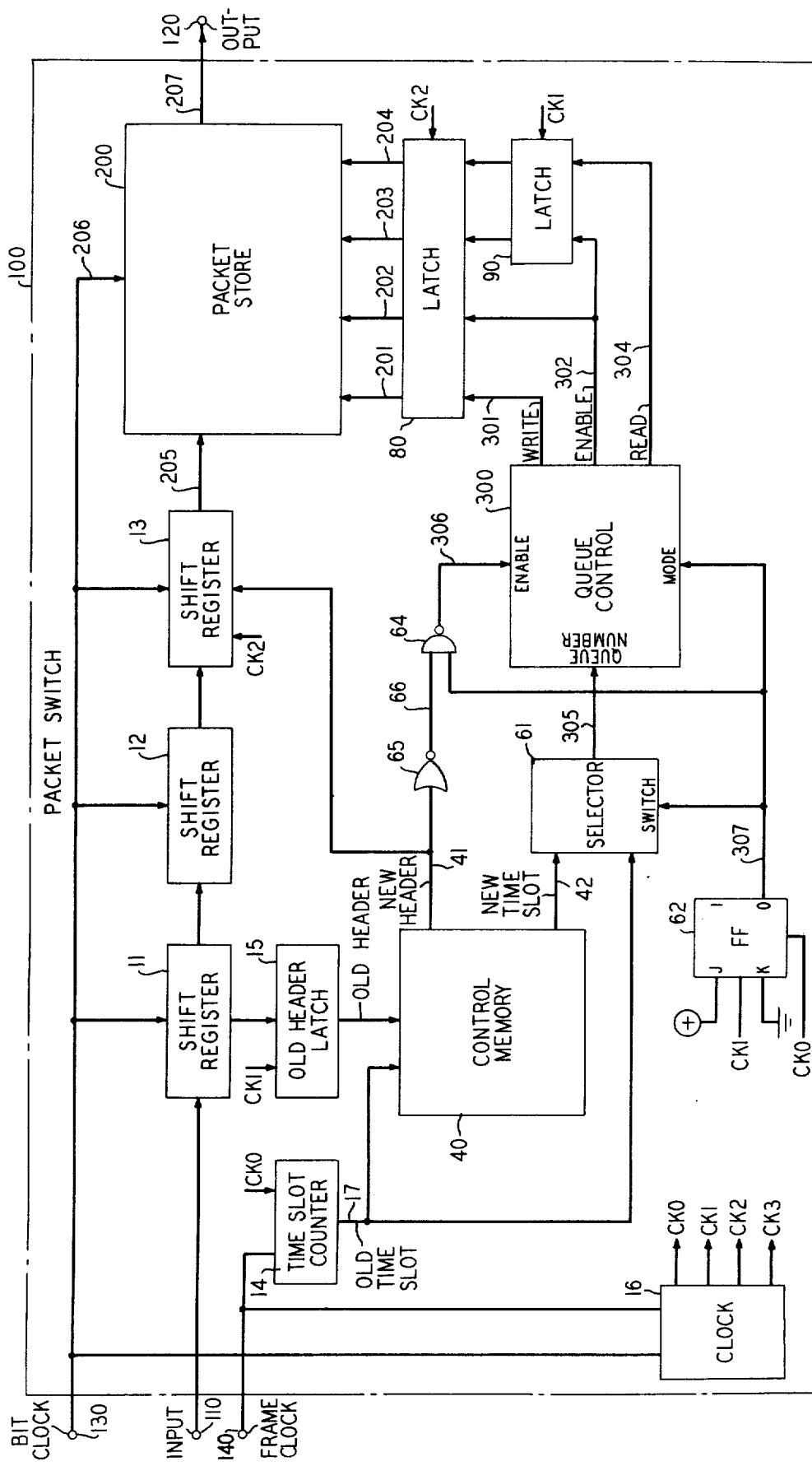
FIG. 1 illustrates a block diagram embodiment of a packet switch in accordance with the principles of the invention.

Referring to FIG. 1, the illustrative packet switch embodiment is operable in a typical time-division multiplex digital data communications system, input terminal 110 being connectable to a multiplexer and output terminal 120 being connectable to a demultiplexer. Illustratively, each time slot in a time-division multiplexed data frame corresponds to a packet of data. A typical frame includes eight time slots, or data packets. For ease and clarity of description, the length of a packet is assumed herein to be 81 bits, including a packet header having 9 bits of routing information.

Briefly, packet switch 100, in providing an output packet in the time slot in which an input packet is received, operates as follows. An input frame including a plurality of input data packets is received at terminal 110. Each packet is serially clocked through shift registers 11, 12, and 13, thence over lead 205 to packet store 200. Shift register 11 assembles a packet header from an input packet, the assembled header hereinafter being called the old header. Responsive to a known frame clock signal provided at terminal 140 and clock signal CK0, described hereinafter, time slot counter 14 provides a time slot number for the input data packet, hereinafter referred to as the old time slot number. Responsive to the old header and the old time slot number, control memory 40 provides a new header to shift register 13 and a new time slot number to queue control 300. The value of the new header or time slot number may be the same as, or different than, the value of the old header or time slot number. The new header and the nonheader remainder of the input packet are thereafter written into a queue in packet store 200, the queue corresponding to the new time slot number. Concurrently, a previously received packet is read from a queue corresponding to the old time slot number, inserted into an output data frame, and provided to output terminal 120. Thereby, in accordance with a first aspect of the invention, packet switch 100 functions to move a packet of data from a first time slot to a second time slot. According to a second aspect of the invention, packet switch 100 functions to change header routing information so that a data packet may be advantageously routed through the digital communications system channel by channel on its journey between digital devices.

Figure 2:
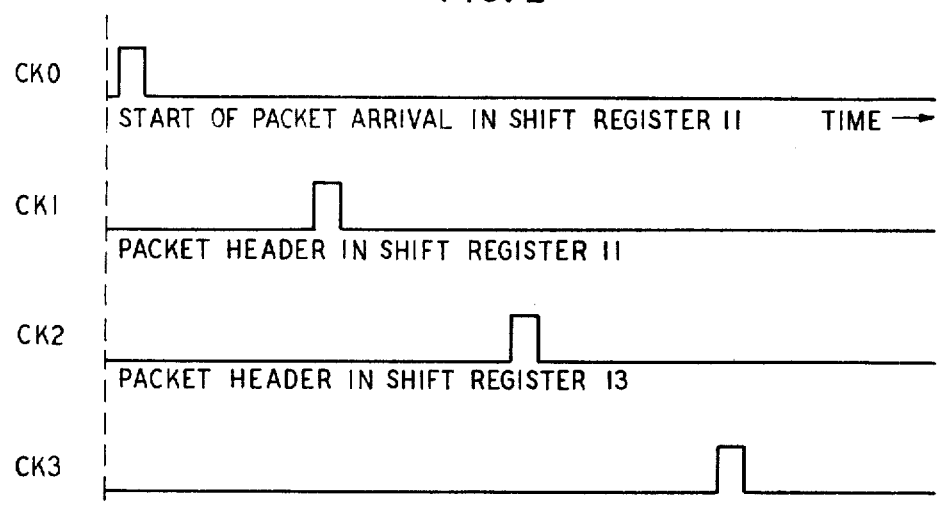
FIG. 2 illustrates relative time relationships among a plurality of clock signals within the packet switch of FIG. 1.

In order to achieve high packet switch throughput, an input data packet is clocked through switch 100 at a speed approaching that at which the plurality of registers therein may reasonably operate. Accordingly, clock timing in switch 100 is controlled by four clock signals labeled CK0; CK1, CK2, and CK3, the relative timing relationships of which are illustrated in FIG. 2. The four clock signals are derived in a straight forward manner by clock 16 from a known bit clock signal provided at terminal 130 and the frame clock signal provided at terminal 140. Specifically, signals CK0 and CK1 are provided by clock 16 responsive respectively to the first bit and the last bit of a packet header entering shift register 11. Signal CK2 occurs responsive to the packet header having been serially shifted into shift register 13. Clock signal CK3 occurs at a predetermined time subsequent to CK2. Thereby, in accordance with the principles of the invention, high throughput is obtained, an output packet in the old time slot being delayed with respect to the input packet by a time interval corresponding to that for one frame. Further, packet switch 100 may be readily implemented with known integrated circuit apparatus, thereby obtaining a less expensive packet switching unit than heretofore achieved.

More particularly, the packet header is assembled in shift register 11. When assembled and responsive to clock signal CK1, the old header is routed through old header latch 15 into a first input of control memory 40. Illustratively, control memory 40 includes an addressable random access memory as typified by Texas Instruments Incorporated TMS 4033. Responsive to the frame clock signal provided at terminal 140, time slot counter 14 extends the old time slot number to a second input of control memory 40. The old header and the old time slot number are employed by control memory 40 to provide the new header to logic gate 65 and to shift register 13 both over lead 41 as well as the new time slot number to queue control 300 over lead 42 through selector 61. If the new header corresponds to a hereinafter-described fill packet, logic gate 65 provides a predetermined inhibit signal, illustratively a logic one signal, to lead 66. Otherwise, logic gate 65 provides a predetermined enable signal, illustratively a logic zero signal, to lead 66, lead 66 being connected to a first input of logic gate 64. Responsive to clock signal CK2, the new header is loaded into shift register 13 overwriting the old header, which old header, during the interim, serially propagated through shift registers 11 and 12 thence into shift register 13. concurrently, shift register 12 serves as a delay so that queue control 300 can, responsive respectively to the old and the new time slot numbers, ascertain the respective locations in packet store 200 from which and into which the output and the input packets of data are to be read and written, respectively.

Responsive to clock signal CK0, flip-flop 62 is reset to provide a first predetermined logic signal, functioning as a read signal and being illustratively a logic zero signal, over lead 307 jointly to a mode, i.e., read or write, input of queue control 300, a switch input of selector 61, and a second input of logic gate 64. Thereby, the old time slot number is extended over lead 17 from time slot counter 14 through selector 61, thence over lead 305 to a queue number input of queue control 300. Then, as hereinafter described, queue control 300 extends a read address and a read enable signal to latch 90 over leads 304 and 302, respectively.

Responsive to clock signal CK1, flip-flop 62 is set to provide a second predetermined logic signal, functioning as a write signal and being illustratively a logic one signal, to lead 307. Responsive to the coincidence of the write signal and the predetermined enable signal on lead 66, logic gate 64 provides an input enable signal to an enable input of queue control 300. Thereby, the new time slot number is extended from control memory 40 over lead 42 through selector 61, thence to the queue number input of queue control 300. Then, as hereinafter described, queue control 300 extends a write address and a write enable signal, respectively over leads 301 and 302, to latch 80. Concurrently, the aforedescribed read address and read enable signals are extended from latch 90 to latch 80.

Responsive to clock signal CK2, the read and write address signals as well as the read and write enable signals, are extended from latch 80 over, respectively, leads 204, 201, 203 and 202 to packet store 200. In response to the address and enable signals, a previously received data packet is read, or retrieved, from the queue corresponding to the old time slot number, advantageously inserted into the old time slot number of an output multiplex frame, and provided over lead 207 to terminal 120. Concurrently, the input data packet is written, or stored, in the queue of packet store 200 corresponding to the new time slot number.

Figure 3:
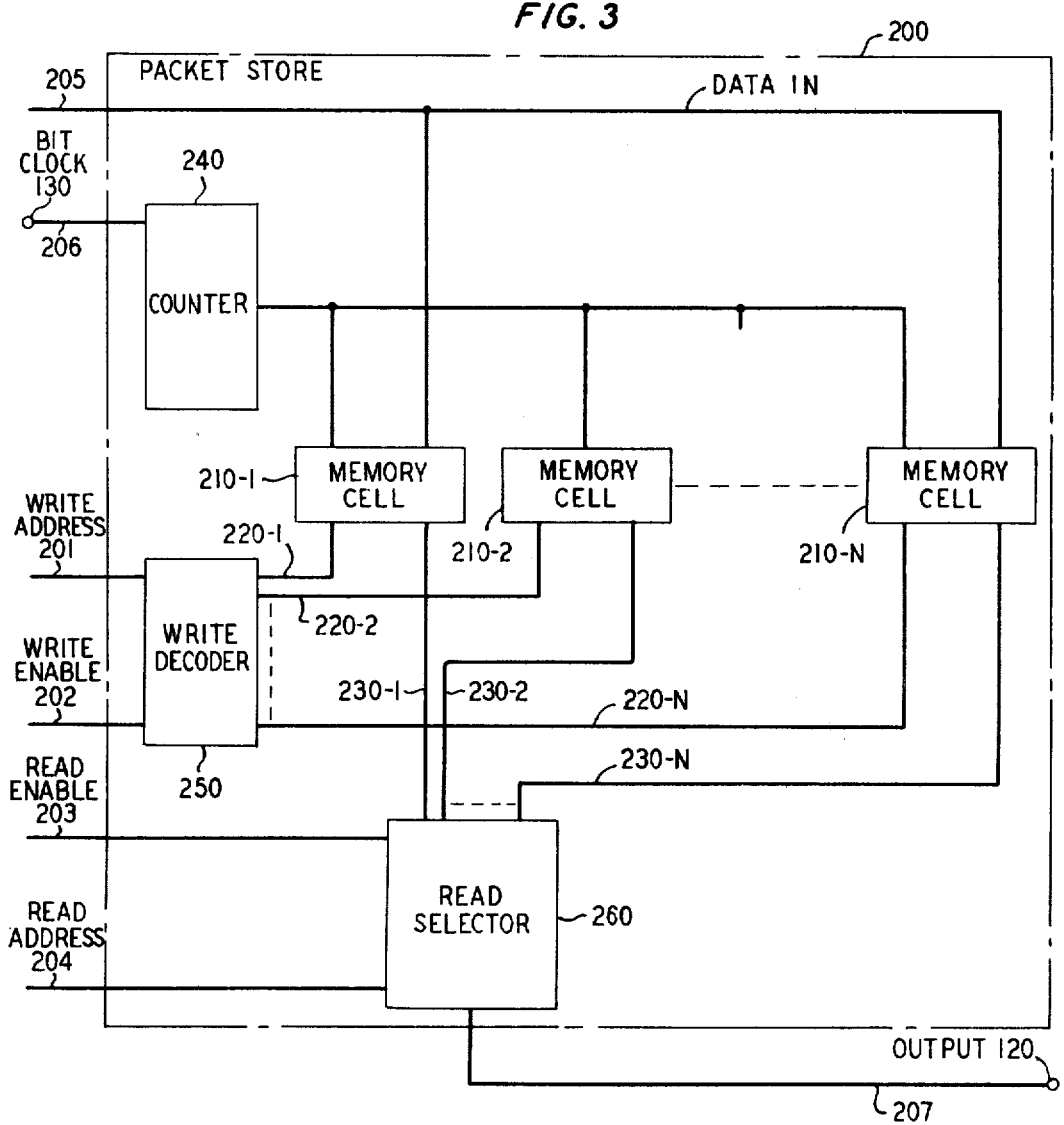
FIG. 3 illustrates a packet store within the packet switch of FIG. 1.

Referring to FIG. 3, packet store 200 includes a plurality of memory elements, as typified by an array of memory cells 210-1 through 210-N. Each packet store memory cell is one packet in length, illustratively 81 bits, and readily realizable using known components. In one exemplary embodiment, each memory cell is included in one of a plurality of First-In-First-Out (FIFO) queues, the number of queues corresponding to the number of time slots in a multiplex frame. For ease of description, assume packet store 200 includes 64 memory cells and assume a group of eight consecutive memory cells corresponds to one of eight queues, or time slots, in a data frame.

To read a packet of data from packet store 200, the memory cell from which the packet is to be read is selected by read selector 260 responsive to the aforedescribed read address and read enable signals applied respectively to leads 204 and 203. Read selector 260 thence extends a select signal over a predetermined one of leads 230-1 through 230-N to the selected cell. The packet is then read from the selected cell, inserted into the output frame, and provided to output terminal 120 over lead 207.

To write a packet of data into packet store 200, the input data packet including the new header are, as aforedescribed, propagated from shift register 13 over lead 205 to a memory cell, lead 205 being jointly connected to an input of each of the plurality of memory cells 210-1 through 210-N. Responsive to the write address on lead 201 and the write enable signal on lead 202, the memory cell into which the packet is written is selected by write decoder 250 over a predetermined one of leads 220-1 through 220-N. After the cell is selected, the bit clock signal provided at terminal 130 and extended to packet store 200 over lead 206 is applied as an input to counter 240 which thereafter straight forwardly counts the bits of the packet of data on lead 205 into the selected cell.

Two illustrative embodiments of queue control 300, called respectively a dedicated store queue control and a shared store queue control are now described.

Figure 4:
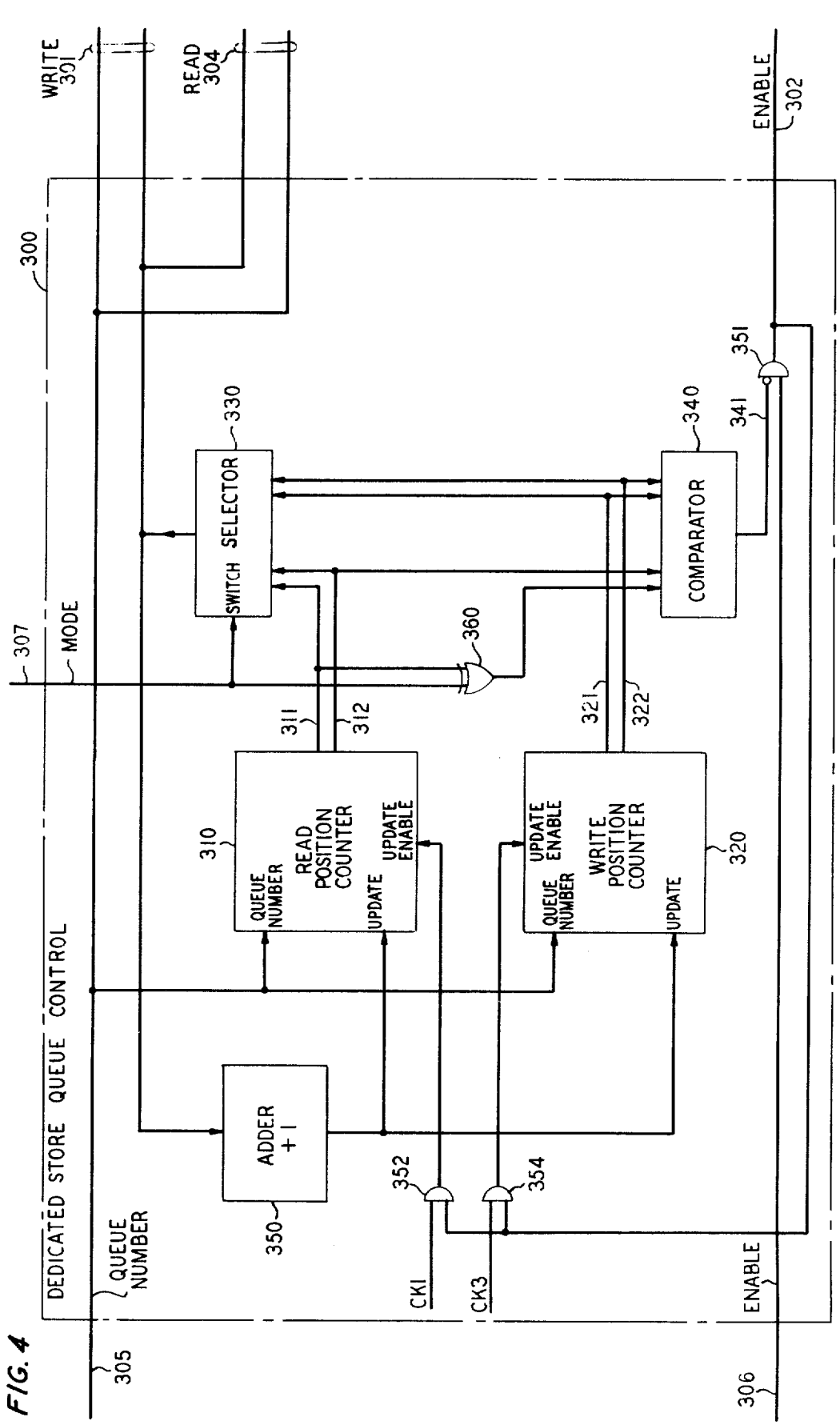
FIG. 4 illustrates a dedicated store queue control arrangement within the packet switch of FIG. 1.

Referring to FIG. 4, which illustrates dedicated store queue control 300, each of read and write position counters 310 and 320 comprises a plurality of address registers. The contents of each address register include a direct address of a memory cell in a queue in packet store 200. As previously described, a queue comprises a plurality of consecutive memory cells. Illustratively, an address register in read position counter 310 contains the address of the memory cell corresponding to the start of a FIFO queue, i.e., the address of the memory cell containing a packet of data, which packet of data is next to be read from the queue and inserted in the old time slot of an output multiplex frame. In parallel fashion, an address register in write position counter 320 contains the address of the memory cell next available in the queue to store an input data packet. The length of each address register is $(1 + \log_2 M)$ bits, M being the number of memory cells in the queue. In the illustrative embodiment, M equals eight corresponding to eight memory cells in each queue. Thus each address register is 4 bits in length. The extra bit in the address register, i.e., the bit in excess of $\log_2 M$ bits, functions as an overflow indicator. Accordingly, whenever the contents of the address registers in read and write counters 310 and 320 corresponding to the queue are equal, the queue is empty, indicating to packet switch 100 that a fill packet should be inserted in the output frame. A fill packet, also called a dummy packet in the art, is a predetermined packet detectable by the packet switch as not requiring transmission between digital devices. Conversely, whenever the contents of the two address registers differ only in the overflow bit, the queue is full, indicating the input data packet is to be rejected by packet switch 100, i.e., the packet is not written into packet store 200.

More particularly, responsive to a read logic zero signal provided over lead 307 to the mode input of dedicated control 300 and responsive to the old queue number, i.e., the old time slot number, provided over lead 305, a read address signal is extended over lead 312 from the old time slot queue address register in read position counter 310 through selector 330 to lead 304. concurrently, the contents of the old time slot number queue address registers of read and write position counters 310 and 320 are provided over leads 312 and 322, respectively, to comparator 340. On the one hand, if the two address registers contain the same address, comparator 340 provides an inhibit signal to lead 341 indicating the queue is empty. The coincidence of the inhibit signal and the input enable signal on lead 306 is ascertained by logic gate 351 and, if present, extended to lead 302. Responsive to the signal on lead 302, a fill packet is inserted by packet switch 100 into the output frame. On the other hand, if the two address registers do not contain the same address, comparator 340 provides an enable signal to lead 341 indicating the queue includes at least one previously received packet. The coincidence of the comparator enable signal and the input enable signal on lead 306 is ascertained by logic 351 and, if present, extended jointly to lead 302 and to an input of logic gate 352. Clock signal CK1 is provided to a second input of logic gate 352. An output of gate 352 is connected to an update enable input of read position counter 310. Responsive to clock signal CK1 and the coincidence of the comparator and input enable signals on lead 302, the contents of the read address register are incremented by adder 350. Thereby the contents of the read address register are advanced to correspond to the direct address of the next of the consecutive memory cells in the FIFO queue, i.e., the cell from which a packet may next be read. Thus, read position counter 310 is initialized to respond to the next input data frame.

Responsive to a write logic one signal provided over lead 307 to the mode input of queue control 300 and responsive to the new queue number, i.e., the new time slot number, provided over lead 305, a write address signal is extended over lead 322 from the new time slot queue address register in write position counter 320 through selector 330 to lead 301. Concurrently, the contents of the new time slot queue address registers in read and write position counters 310 and 320, respectively, are compared by comparator 340. On the one hand, if the two address registers differ only in their overflow bits, comparator 340 provides an inhibit signal to lead 341 indicating that the queue is full, the read overflow bit being provided on lead 312 through logic gate 360 and the write overflow bit on lead 321. The coincidence of the comparator inhibit signal and the input enable signal on lead 306 is extended through logic device 351 to lead 302. Responsive to the signal on lead 302, packet switch 100 rejects the input data packet. Furthermore, responsive to the coincidence of the predetermined inhibit signal on lead 66 and the write logic one signal on lead 307, an input inhibit signal is provided to lead 306, thereinafter also resulting in the rejection of the input data packet. The latter instance of rejection relates to the detection by packet switch 100 of a fill packet. On the other hand, if the contents of the address registers do not so differ as to the overflow bit, comparator 340 provides an enable signal to lead 341 indicating the queue includes at least one memory cell into which a packet can be written. The coincidence of the comparator enable signal and the input enable signal on lead 306 is extended through logic device 351 jointly to lead 302 and to an input of logic gate 354. Clock signal CK3 is provided to a second input of logic gate 354. An output of logic gate 354 is connected to an update enable input of write position counter 320. Thereafter, responsive to clock signal CK3 and the coincidence of the comparator and input enable signals, the contents of the write address register are incremented by adder 350. Thereby the contents of the write address register are advanced to correspond to the direct address of the next available memory cell in the FIFO queue, i.e., the next cell into which a packet may be written. Thus, write position counter 320 is initialized to respond to the next input data packet. Accordingly, in uniformity with the principles of my invention, an improved queue control arrangement, illustrated by the dedicated control of FIG. 4, efficiently resolves contentions for a queue in packet switch 100.

Figure 5:
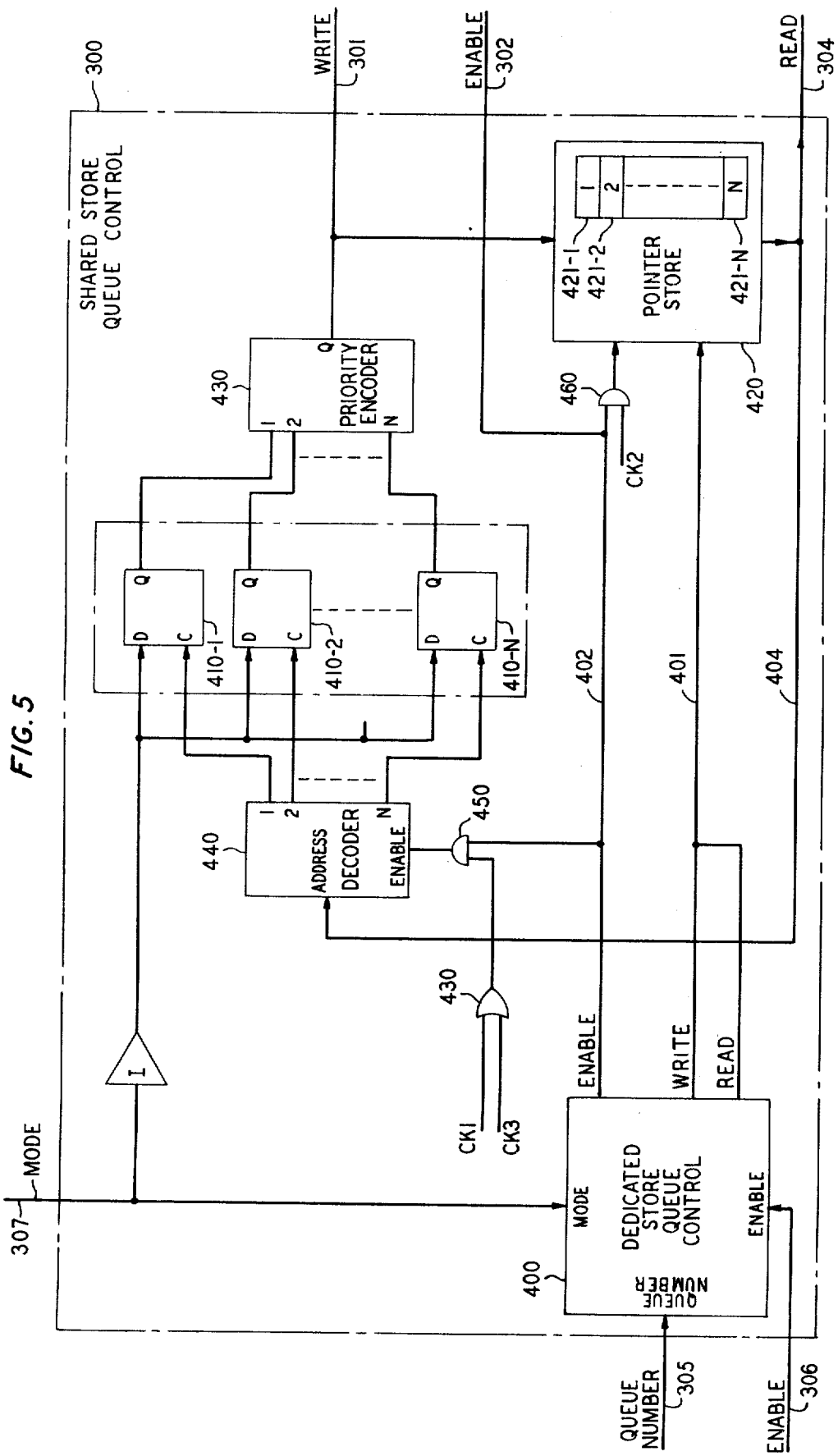
FIG. 5 illustrates a shared store queue control arrangement within the packet switch of FIG. 1.

Referring to FIG. 5, the second illustrative embodiment of queue control 300, called the shared store queue control, includes dedicated store queue control 400, structurally similar to the illustrative queue control of FIG. 4. However, in contradistinction to the FIG. 4 embodiment, the shared control of FIG. 5 advantageously shares, or pools, the memory cells of packet store 200, using an indirect address to a memory cell in the pool rather than the direct address of the cell. Thereby, shared control 300 combines dedicated control 400 and an indirect addressing arrangement, the latter also known in the art as a pointer addressing arrangement.

Broadly, to read a packet from a memory cell and insert the packet into an output multiplex frame, a pointer to the memory cell is obtained from pointer store 420. After being read, the memory cell becomes available for subsequent queue assignment, i.e., the cell is returned to the pool of empty cells. Conversely, when a data packet is to be written into packet store 200, a memory cell is selected from the pool of empty cells, the cell is assigned to the queue through pointer store 420, and a pointer to the cell is stored therein.

In particular, flip-flops 410-1 through 410-N are in one-to-one correspondence with memory cells 210-1 through 210-N of packet store 200. Illustratively, a flip-flop is set when the memory cell is empty and reset when the cell is occupied, i.e., has stored therein a packet of data. Pointer store 420 includes a plurality of pointer store memory cells 421-1 through 421-N. Each pointer cell contains the address of a packet store memory cell. Accordingly, each pointer cell is included in one of a plurality of FIFO queues, the number of queues corresponding to the number of time slots in an output multiplex data frame. For ease of description, assume pointer store 420 includes 64 pointer cells and assume a group of eight consecutive pointer cells corresponds to one of eight queues, or time slots, in a data frame. Further and yet illustratively, an address register in read position counter 310 of dedicated control 400 contains the address of the pointer cell in pointer store 420 corresponding to the start of a FIFO queue. The pointer cell, in turn, contains the direct address of a memory cell. The memory cell, in turn, contains a packet of data next to be inserted in the old time slot of an output multiplex frame. In parallel fashion, an address register in write position counter 320 of dedicated control 400 contains the address of the pointer store cell in pointer store 420, next available in the queue to store a pointer to the memory cell into which the next input data packet in the queue may be written. Hence a memory cell is addressed indirectly through a pointer cell in pointer store 420.

The illustrative queue control of FIG. 5 operates as follows. Responsive to a read logic zero signal provided over lead 307 to the mode input of both queue control 300 and dedicated control 400 and responsive to the old queue number provided over lead 305, a read address signal is extended from dedicated control 400 over lead 401 to pointer store 420. Also, a read enable signal is extended from dedicated control 400 over lead 402 to lead 302. Responsive to the read address signal, the contents of the addressed pointer store cell are extended from pointer store 420 jointly to read address lead 304 and over lead 404 to an address input of decoder 440. Thereafter, the read enable signal on lead 402 and clock signal CK1, the latter as extended through logic device 430, are combined by AND gate 450 and provided to an enable input of decoder 440. In response to the combined signal, the flip-flop corresponding to the memory cell of packet store 200 from which the data packet is read is set. Thereby the state of the then set flip-flop indicates to priority encoder 430 that the memory cell has been returned to the pool of empty cells.

Responsive to a write logic one signal provided over lead 307 to the mode input of queue control 300 and responsive to the new time slot number provided over lead 305, a write address signal is extended from the new time slot queue address register in write position counter 320 of dedicated control 400 over lead 401 to pointer store 420. Further, a write enable signal is provided over lead 402 jointly to lead 302 and to a first input of AND gate 460. The coincidence of clock signal CK2 and the write enable signal on lead 402 is ascertained by AND gate 460. Concurrently, priority encoder 430 locates one of the plurality of flip-flops 410-1 through 410-N in the pool of empty memory cells and provides the address of the flip-flop, and hence the address of the memory cell over lead 301 to an input of pointer store 420. Responsive to a coincidence output of gate 460, the memory cell address on lead 301 is stored in the pointer cell of pointer store 420 corresponding to the write address signal on lead 401. Thereafter, the memory cell address is provided by pointer store 420 to decoder 440 over lead 404, for resetting the corresponding flip-flop, indicating the memory cell is occupied.

Finally, a packet switch in accord with the principles of the invention, such as packet switch 100, allows for modular construction of a still larger packet switch. A large packet switch is typically necessitated as more and more digital devices are added to the digital data communications system. Illustratively, although not shown in the drawings, each switch of a first plurality of packet switches 100 may be connected through an input terminal 110 to one of a plurality of multiplexers. Output terminal 120 of each such packet switch is connected to one of a plurality of inputs to a known time-division line switch. Each of a plurality of outputs from the line switch is connected to input terminal 110 of each of a second plurality of packet switches 100. Output terminal 120 of each such packet switch is connected to a respective demultiplexer.

Although the invention has been described and illustrated in detail, it is to be understood that the same is by way of illustration and example only. Various modifications will occur to those skilled in the art and the invention is not to be considered limited to the embodiment chosen for purposes of disclosure. For example, the number of time slots in an input data frame has been disclosed as equal to the number of time slots in an output data frame. Such equality may not be the case. In particular, an inequality in the number of time slots in the input and the output data frames obtains a packet switch in accord with the principles of the invention which further functions as a concentrator or as an expandor. Thus, the spirit and scope of the invention are limited only by the appended claims.

I claim:

1. In a data communication system, a packet switch for routing a packet of data through said communications system, said packet switch including a packet store having a plurality of queues for storing respective packets of data, and characterized in that said packet switch comprises:
   an input terminal adapted for receiving an input frame of data, said input frame including a first plurality of time slots, an input frame time slot having a packet of data;
   an output terminal adapted for transmitting an output frame of data, said output frame including a second plurality of time slots, an output frame time slot for inserting a packet of data;
   means including a control memory for extending a packet received at said input terminal through said packet store to said output terminal;
   said control memory including means for controlling the transfer of a packet from a first time slot of said input frame to a second time slot of said output frame, each time slot having a predetermined identification and each packet having a header for routing said transfer;
   said transfer controlling means responsive to said first time slot identification and said header of said packet including first means for providing a second packet header for said packet and second means for providing an output signal corresponding to said second time slot identification.

2. The packet switch according to claim 1 further comprising:
   means including a queue control for replacing said first packet header with said second packet header.

3. The packet switch according to claim 2 wherein said queue control comprises:
   means, responsive to said output signal of said second providing means, for storing said packet of data including said second packet header in a packet store queue corresponding to said output signal.

4. The packet switch according to claim 3 wherein said queue control storing means comprises:
   first queue position means individual to a queue for determining a first memory cell in said queue into which said packet of data is to be stored.

5. The packet switch according to claim 3 wherein said queue control storing means comprises:
   second queue position means individual to a queue for determining a second memory cell in said queue from which a second packet of data is to be read.

6. The packet switch according to claim 5 wherein said queue control further comprises:
   means, responsive to said output signal of said second providing means, for inserting said second packet including said second packet header in said second time slot.

7. The packet switch according to claim 4 wherein said queue control storing means further comprises:

second queue position means individual to said queue for determining a second memory cell in said queue from which a second packet of data is to be read.

8. The packet switch according to claim 7 wherein said queue control further comprises:
   means, responsive to said first and second queue position means, for comparing a first and a second memory cell address, said first and said second memory cell addresses corresponding respectively to said first and said second memory cells; and
   means responsive to said comparing means for providing a queue empty signal if said first and said second memory cell addresses are equal.

9. The packet switch according to claim 8 wherein said queue control further comprises:
   means, responsive to said queue empty signal, for providing a predetermined fill packet.

10. The packet switch according to claim 9 wherein said queue control further comprises:
    means, responsive to said second providing means, for inserting said predetermined fill packet in said second time slot.

11. The packet switch according to claim 7 wherein said queue control further comprises:
    means, responsive to said first and second queue position means, for comparing a first and a second memory cell address, said first and said second memory cell addresses corresponding to respectively said first and said second memory cells; and
    means, responsive to said comparing means, for providing a queue full signal if said first and said second memory cell addresses differ in a predetermined manner.

12. The packet switch according to claim 11 wherein said queue control further comprises:
    means, responsive to said queue full signal, for rejecting said packet of data.

13. In a digital data communications system, a packet switch for routing a packet of data through said communications system, said packet of data including a packet header, said packet switch comprising:
    a packet store having a plurality of memory cells, each memory cell for storing a packet of data;
    means including a control memory and a queue control for extending said packet of data to be routed from an input terminal through said packet store to an output terminal;
    said control memory for controlling the transfer of said packet from a first time slot in an input frame provided to said input terminal to a second time slot in an output frame provided to said output terminal, each time slot having a predetermined identification, said control memory including means responsive to said packet header of said packet for providing a second packet header; and
    said queue control for transferring said packet from said first time slot through a memory cell in said packet store to said second time slot, said queue control including means for replacing said packet header with said second packet header.

14. The packet switch according to claim 13 wherein said queue control further comprises:
    a pointer store having a plurality of queues for storing a pointer to a memory cell in said packet store;
    means for identifying an empty state of a memory cell; and
    means responsive to said second time slot identification for providing said pointer to said memory cell through said identifying means to a respective one of said queues in said pointer store.

* * * * *